Patented Aug. 16, 1932

1,871,948

UNITED STATES PATENT OFFICE

GÉRALD BONHÔTE, OF BASEL, SWITZERLAND, ASSIGNOR TO THE FIRM SOCIETY OF CHEMICAL INDUSTRY IN BASLE, OF BASEL, SWITZERLAND

AZO DYESTUFFS AND PROCESS OF MAKING THE SAME

No Drawing. Application filed October 24, 1931, Serial No. 570,982, and in Switzerland November 15, 1930.

According to this invention a new azo-dyestuff is made by coupling 2 : 3-hydroxynaphthoic acid-para-anisidide with diazotized 4-chloro-2-aminodiphenyl-ether. This dyestuff, which thus corresponds to the formula

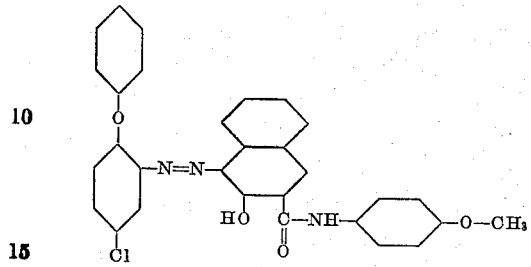

is a red powder insoluble in water. When produced on the fiber or on a suitable substratum it yields a full red tint of remarkable fastness to light which essentially exceeds that of the hitherto described dyestuffs from arylides of 2:3-hydroxynaphthoic acid and diazotized o-aminodiaryl ethers.

The following examples illustrate the invention:—

Example 1

29.3 parts by weight of 2:3-hydroxynaphthoic acid-para-anisidide are dissolved in 500 parts of water with aid of 4 parts of caustic soda. 20 parts of calcined sodium carbonate are now added and the whole is mixed with a diazo-solution prepared from 22.9 parts of 4-chloro-2-aminodiphenyl-ether. The dyestuff separates immediately in the form of a red precipitate.

Example 2

Cotton yarn is impregnated with a grounding liquor made by dissolving 7 grams of para-anisidide of 2:3-hydroxynaphthoic acid in 300 cc. of hot water with addition of 14 cc. of caustic soda solution of 30 per cent. strength and 10 cc. of Turkey red oil, the whole being diluted to 1 liter. The yarn is then wound off and developed in a solution neutralized by means of sodium acetate containing 4 grams of diazotized 4-chloro-2-aminodiphenylether per liter. A red tint is produced which is of excellent properties of fastness, particularly of excellent fastness to light.

Fast tints on wool are obtained by working as prescribed in British Patent No. 310758.

What I claim is:—

As a new product the azo-dyestuff of the formula

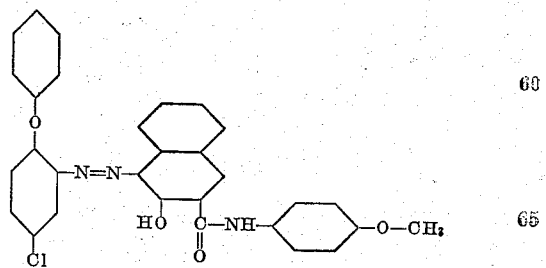

which product, when dry, forms a red powder, and, when produced on the fiber, dyes it a full red tint of remarkable fastness to light.

In witness whereof I have hereunto signed my name this 17th day of October, 1931.

GÉRALD BONHÔTE.